(12) United States Patent
Huang et al.

(10) Patent No.: US 10,351,358 B2
(45) Date of Patent: Jul. 16, 2019

(54) MAGNETIC DRIVE TRANSMISSION METHOD

(71) Applicant: USUN TECHNOLOGY CO., LTD., Taoyuan (TW)

(72) Inventors: Chiu-Fong Huang, Taoyuan (TW); Hsiang-Yueh Yu, Taoyuan (TW)

(73) Assignee: USUN TECHNOLOGY CO., LTD, Taoyuan (TW)

(*) Notice: Subject to any disclaimer, the term of this patent is extended or adjusted under 35 U.S.C. 154(b) by 149 days.

(21) Appl. No.: 15/677,477

(22) Filed: Aug. 15, 2017

(65) Prior Publication Data

US 2018/0050429 A1    Feb. 22, 2018

(30) Foreign Application Priority Data

Aug. 16, 2016  (TW) .............................. 105126111 A
Jun. 9, 2017    (TW) .............................. 106119277 A

(51) Int. Cl.
  *B65G 54/02* (2006.01)
  *H02K 41/00* (2006.01)
  *H02K 49/10* (2006.01)

(52) U.S. Cl.
  CPC ............. *B65G 54/02* (2013.01); *H02K 41/00* (2013.01); *H02K 49/10* (2013.01)

(58) Field of Classification Search
  CPC ........ B65G 54/02; H05K 13/02; H05K 41/00; H05K 49/10
  See application file for complete search history.

(56) References Cited

U.S. PATENT DOCUMENTS

| 8,704,626 B2* | 4/2014 | Fullerton | H01F 7/0247 335/285 |
| 9,239,335 B2* | 1/2016 | Heise | B65G 54/02 |
| 9,664,703 B2* | 5/2017 | Heise | B65G 54/02 |
| 2012/0295358 A1* | 11/2012 | Ariff | B65G 15/58 436/47 |

* cited by examiner

*Primary Examiner* — Gene O Crawford
*Assistant Examiner* — Keith R Campbell
(74) *Attorney, Agent, or Firm* — Muncy, Geissler, Olds & Lowe, P.C.

(57) ABSTRACT

A magnetic drive transmission method includes the steps of: disposing solid magnetic device and ring-shaped magnetic device at top and bottom surfaces of work platform, while keeping the solid magnetic device in axial alignment with the hollow inner diameter of the ring-shaped magnetic device the solid magnetic device enters within the magnetic field lines of the ring-shaped magnetic device so as to create a magnetic field downstream between the solid magnetic device and the ring-shaped magnetic device that changes the thrust of the same polarity repulsion and to further cause the solid magnetic device and the ring-shaped magnetic device to attract each other in a balanced manner, and then using the ring-shaped magnetic device to drive the solid magnetic device in moving a predetermined workpiece along one surface of the work platform to a predetermined location.

7 Claims, 9 Drawing Sheets

Dispose a solid magnetic device and a ring-shaped magnetic device at opposing top and bottom surfaces of a work platform and keep the solid magnetic device and the ring-shaped magnetic device in axial alignment — 101

Keep the same magnetic N poles (or magnetic S poles) of the solid magnetic device and ring-shaped magnetic device to face toward the opposing top and bottom surfaces of the work platform respectively — 102

Move the ring-shaped magnetic device into contact with one surface, namely, the bottom surface of the work platform, and then move the solid magnetic device into contact with the other surface, namely, the top surface of the work platform while keeping the solid magnetic device in axial alignment with the hollow inner diameter of the ring-shaped magnetic device — 103

When the solid magnetic device is attached onto the top surface of the work platform, subject to the magnetic repulsive effect between the magnetic N poles (or magnetic S poles) of the solid magnetic device and ring-shaped magnetic device, the solid magnetic device falls into the magnetic field lines of the ring-shaped magnetic device, creating a magnetic field downstream between the solid magnetic device and the ring-shaped magnetic device that changes the thrust of the same polarity (same magnetic N poles or same magnetic S poles) repulsion, causing the solid magnetic device and the ring-shaped magnetic device to attract each other at the opposing top and bottom surfaces of the work platform and to keep in balance in the transverse direction — 104

Move the solid magnetic device and the ring-shaped magnetic device along the opposing top and bottom surface of the work platform synchronously to deliver a predetermined workpiece near the solid magnetic device, forcing the workpiece to slide along the top surface of the work platform to a predetermined location — 105

*FIG. 1*

MAGNETIC DRIVE TRANSMISSION METHOD

This application claims the priority benefit of Taiwan patent application numbers 105126111 and 106119277, filed on Aug. 16, 2016 and Jun. 9, 2017.

BACKGROUND OF THE INVENTION

1. Field of the Invention

The present invention relates to magnetic drive technology and more particularly, to a magnetic drive transmission method in which a solid magnetic device and a ring-shaped magnetic device are attached with the same polarity onto the opposing top and bottom surfaces of a work platform to cause generation of a magnetic downstream, causing a change of the magnetic thrust between the solid magnetic device and the ring-shaped magnetic device into magnetic attraction so that the ring-shaped magnetic device can be controlled to drive the solid magnetic device in moving a predetermined workpiece smoothly along the top surface of the work platform without much friction resistance.

2. Description of the Related Art

With the continuous progress of the era of electronic technology, conventional manual feeding or semi-automatic transmission of close-up transport operations in automated processing and manufacturing machinery, production lines, processing object transmission in quality control and warehousing logistics transport are quite time-consuming and not conducive to mass production or large number of items of transmission operations. Therefore, it is possible to effectively shorten the working time and to improve the quality of the automatic operation by passing materials or processing objects by means of an automatic transmission system such as conveyor belts, roller conveyors, or a robot arms. Nowadays many automatic transmission systems and measures have been widely used for automated production.

Conventional conveyor belt, roller conveyor or mechanical arm-based conveyor systems or transporting means used in vending machines are driven by motor drives, pneumatic cylinders and/or hydraulic cylinders. However, noises, dust or impacts will be produced during delivery, lowering the delivery efficiency. Especially for exquisite mechanical processing, electronic high-tech products manufacturing, dust-free processing or automatic delivery of goods within a vending machine, the automatic transmission system requirements are critical, and the delivery operation must be performed in low noise or dust-free environments. Conventional conveying belt, roller or mechanical arm-based conveyor systems are still not satisfactory in function for the applications of fine mechanical processing, electronic high-tech products manufacturing or dust-free processing.

Therefore, non-contact transmission measures are created for use in clean rooms and other dust-free environments for processing production, manufacturing, transportation and other operational applications for delivering electronic and electrical components, semiconductor products and other high-tech products, or for use in automatic vending machines for delivering selling items.

By using the principle of repulsion and attraction between two magnetic poles, magnets can be moved on the conveyance path to transfer various components and the semiconductor products to the respective processing work areas, carrying out the necessary processing. FIGS. 7, 8 and 9 illustrate non-contact transmission applications in transferring predetermined workpieces. As illustrated in FIGS. 7 and 8, two solid magnets A,B are disposed at two opposite sides of a transmission platform C to magnetically attract each subject to magnetic attraction between two different magnetic poles (S pole and N pole). One solid magnet A is controlled to drive the other solid magnet B, causing the other solid magnet B to move a workpiece D in a non-contact manner and avoiding generation of dust or other fine particles. For moving a relatively larger workpiece D, the size of the solid magnets A,B must be relatively larger, or more solid magnets A,A1,B,B1 should be used. However, increasing the size of the solid magnets A,B or the amount of the solid magnets A,A1,B,B1 will relatively increase the friction resistance between the solid magnets A,A1,B,B1 and the transmission platform C, lowering the speed in moving the workpiece D and affecting the progress of the processing process. Further, when increased the amount of the solid magnets A,A1,B,B1, the enhanced magnetic force can also affect the performance of the machining tools in the working areas around the transmission platform. Although this non-contact transmission design can achieve the effect of non dust, it cannot eliminate problem of the friction resistance and slow processing speed in the actual implementation. An improvement in this regard is necessary.

According to tests on the application of two solid magnets A,B and four solid magnets A,A1,B,B1, we obtained the data as follows:

Lateral run-off force (magnetic attraction force)

| Size | Cylinder: ⌀20 mm Thickness 10 mm Cylinder: ⌀20 mm Thickness 10 mm | | | |
|---|---|---|---|---|
| Plate thickness | $1^{st}$ | $2^{nd}$ | $3^{rd}$ | Average |
| 1.0 mm | 3.75 | 3.80 | 3.90 | 3.82 |
| 1.2 mm | 3.50 | 3.50 | 3.50 | 3.50 |
| 1.5 mm | 3.65 | 3.60 | 3.65 | 3.63 |
| 2.0 mm | 3.52 | 3.25 | 3.35 | 3.37 |

Minimum starting force (maximum electrostatic friction)

| Size | Cylinder: ⌀20 mm Thickness 10 mm Cylinder: ⌀20 mm Thickness 10 mm | | | |
|---|---|---|---|---|
| Plate thickness | $1^{st}$ | $2^{nd}$ | $3^{rd}$ | Average |
| 1.0 mm | 3.05 | 3.25 | 3.05 | 3.12 |
| 1.2 mm | 2.60 | 2.50 | 2.55 | 2.55 |
| 1.5 mm | 2.90 | 2.75 | 2.75 | 2.80 |
| 2.0 mm | 2.20 | 2.35 | 2.25 | 2.27 |

Lateral run-off force (magnetic attraction force)

| Size | Cylinder: ⌀20 mm Thickness 20 mm Cylinder: ⌀20 mm Thickness 20 mm | | | |
|---|---|---|---|---|
| Plate thickness | $1^{st}$ | $2^{nd}$ | $3^{rd}$ | Average |
| 1.0 mm | 10.50 | 10.60 | 10.75 | 10.62 |
| 1.2 mm | 9.30 | 9.00 | 9.00 | 9.10 |
| 1.5 mm | 9.20 | 9.30 | 9.55 | 9.35 |
| 2.0 mm | 8.30 | 8.50 | 8.50 | 8.43 |

Minimum starting force (maximum electrostatic friction)

| Size | Cylinder: Ø30 mm Thickness 20 mm | | | |
|---|---|---|---|---|
| | Cylinder: Ø30 mm Thickness 20 mm | | | |
| Plate thickness | 1st | 2nd | 3rd | Average |
| 1.0 mm | 8.25 | 8.50 | 8.75 | 8.50 |
| 1.2 mm | 7.26 | 7.41 | 7.53 | 7.40 |
| 1.5 mm | 7.15 | 7.80 | 7.80 | 7.58 |
| 2.0 mm | 5.50 | 5.90 | 5.80 | 5.73 |

When two solid magnets A,B (diameter Ψ20 mm and diameter Ψ30 mm) are used, the average magnetic attraction force between the two solid magnets A,B at the two opposite sides of the transmission platform C can be within the range of 3.50 Kgf~10.62 Kgf, the average maximum electrostatic friction can be within the range of 2.27 Kgf~8.50 Kgf. When the two solid magnets A,B are attached to the two opposing surfaces of the transmission platform C with the N pole of one solid magnet A facing toward the S pole of the other solid magnet B, the minimum starting force (the maximum electromagnetic friction) is large, thus, a large resistance will be produced during delivery of the workpiece D. There will be a possibility that a pause or a jam occurs during the conveyance of the workpiece D along the transmission platform C.

FIG. 6 illustrates the use of a solid magnetic device 1a and a ring-shaped magnetic device 2a in delivering a workpiece 4a along a transmission platform 3a. When the magnetic N pole of the solid magnetic device 1a is approaching the top surface of the transmission platform 3a after the magnetic N pole of the ring-shaped magnetic device 2a is attached to the bottom surface of the transmission platform 3a, magnetic repulsion is created. Once the solid magnetic device 1a is attached to the top surface of the transmission platform 3a, the solid magnetic device 1a enters the center of the magnetic field lines of the ring-shaped magnetic device 2a, causing generation of a magnetic field downstream and magnetic attraction between the solid magnetic device 1a and the ring-shaped magnetic device 2a in a balanced manner. At this time, the ring-shaped magnetic device 2a can be controlled to drive the solid magnetic device 1a in moving a predetermined workpiece 4a along the transmission platform 3a without vibration or deviation. However, since the solid magnetic device 1a and the ring-shaped magnetic device 2a have the respective same magnetic poles (N poles or S poles) respectively attached to the opposing top and bottom surface of the transmission platform 3a, the magnetic repulsion problem between the solid magnetic device 1a and the ring-shaped magnetic device 2a must be overcome.

Therefore, it is desirable to provide a non-contact transmission measure practical for use in the fabrication of electronic and electrical components and semiconductor products for non-contact component delivery in an efficient manner without causing much friction resistance.

SUMMARY OF THE INVENTION

The present invention has been accomplished under the circumstances in view. By means of collecting relevant information and multi-evaluation and consideration with accumulated many years of experience and continuous trial and modification, the present inventor creates a magnetic drive transmission method, in which a solid magnetic device and a ring-shaped magnetic device are attached with the same polarity onto the opposing top and bottom surfaces of a work platform to cause generation of a magnetic downstream, causing a change of the magnetic thrust between the solid magnetic device and the ring-shaped magnetic device into magnetic attraction so that the ring-shaped magnetic device can be controlled to drive the solid magnetic device in moving a predetermined workpiece smoothly along the top surface of the work platform without much friction resistance.

It is the main object of the present invention to provide a magnetic drive transmission method, which comprises the step of disposing a solid magnetic device and a ring-shaped magnetic device at opposing top and bottom surfaces of a work platform, the step of keeping the same magnetic poles of the solid magnetic device and ring-shaped magnetic device to face toward the opposing top and bottom surfaces of the work platform respectively, the step of moving the solid magnetic device and the ring-shaped magnetic device into contact with the top and bottom surfaces of the work platform respectively for causing the solid magnetic device to enter within the magnetic field lines of the ring-shaped magnetic device so as to create a magnetic field downstream between the solid magnetic device and the ring-shaped magnetic device that changes the thrust of the same polarity repulsion and to further cause the solid magnetic device and the ring-shaped magnetic device to attract each other in a balanced manner, and the step of using the ring-shaped magnetic device to drive the solid magnetic device in moving a predetermined workpiece along one surface of the work platform to a predetermined location.

Further, the solid magnetic device can be shaped like a cylinder, oval column, rectangular column, hexagonal column or polygonal column, and the ring-shaped magnetic device can be shaped like a circular ring, oval ring, rectangular ring, hexagonal ring or polygonal ring.

Further, when the same magnetic pole of the solid magnetic device is attached to the top surface of the work platform after attachment of the magnetic N pole or S pole of the ring-shaped magnetic device to the bottom surface of the work platform, a magnetic downstream is created between the solid magnetic device and the ring-shaped magnetic device, causing magnetic attraction between the solid magnetic device and the ring-shaped magnetic device and keeping the solid magnetic device in the position at the center of the ring-shaped magnetic device and prohibiting the solid magnetic device from lateral deviation relative to the ring-shaped magnetic device, and therefore the solid magnetic device and the ring-shaped magnetic device are maintained in balance, reduction the friction resistance between the solid magnetic device or ring-shaped magnetic device and the work platform.

Other advantages and features of the present invention will be fully understood by reference to the following specification in conjunction with the accompanying drawings, in which like reference signs denote like components of structure.

BRIEF DESCRIPTION OF THE DRAWINGS

FIG. 1 is an operational flow chart of the present invention.

DETAILED DESCRIPTION OF THE PREFERRED EMBODIMENT

Figure 2:
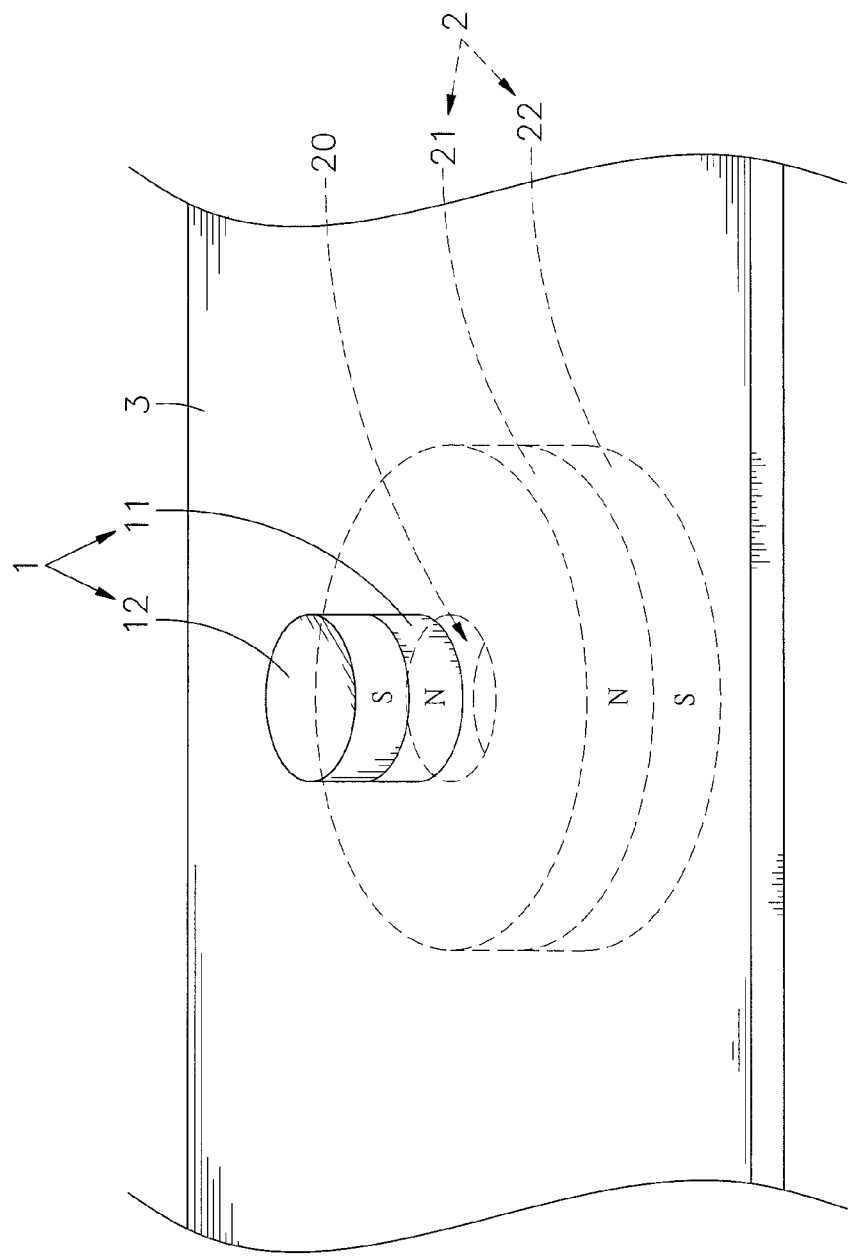
FIG. 2 is a schematic perspective view, illustrating the magnetic N pole of a solid magnetic device and the magnetic N pole of a ring-shaped magnetic device respectively attached to the opposing top and bottom surface of a metal work platform in accordance with the present invention.
Figure 3:
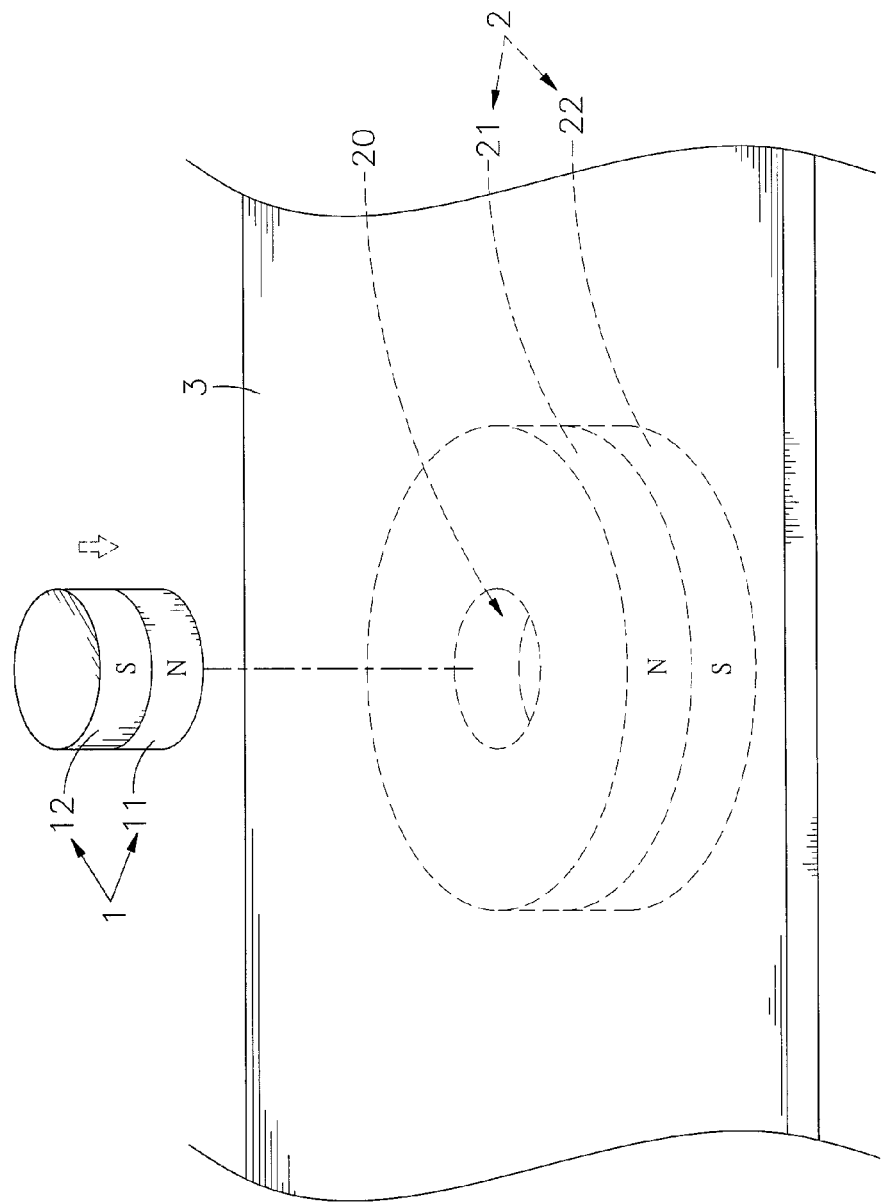
FIG. 3 illustrates the magnetic N pole of the ring-shaped magnetic device attracted to the bottom surface of the metal work platform and the magnetic N pole of the solid magnetic device aimed at the hollow inner diameter of the ring-shaped magnetic device.
Figure 4:
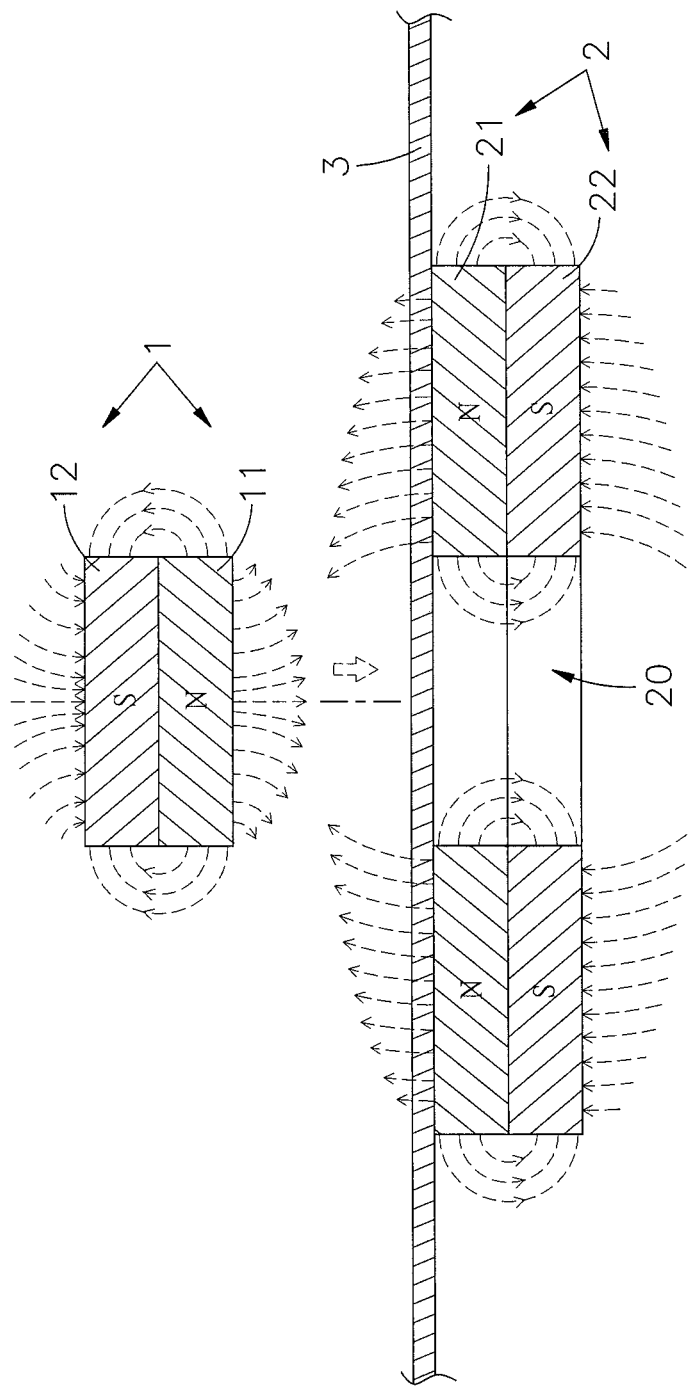
FIG. 4 is a sectional side view of FIG. 3.
Figure 5:
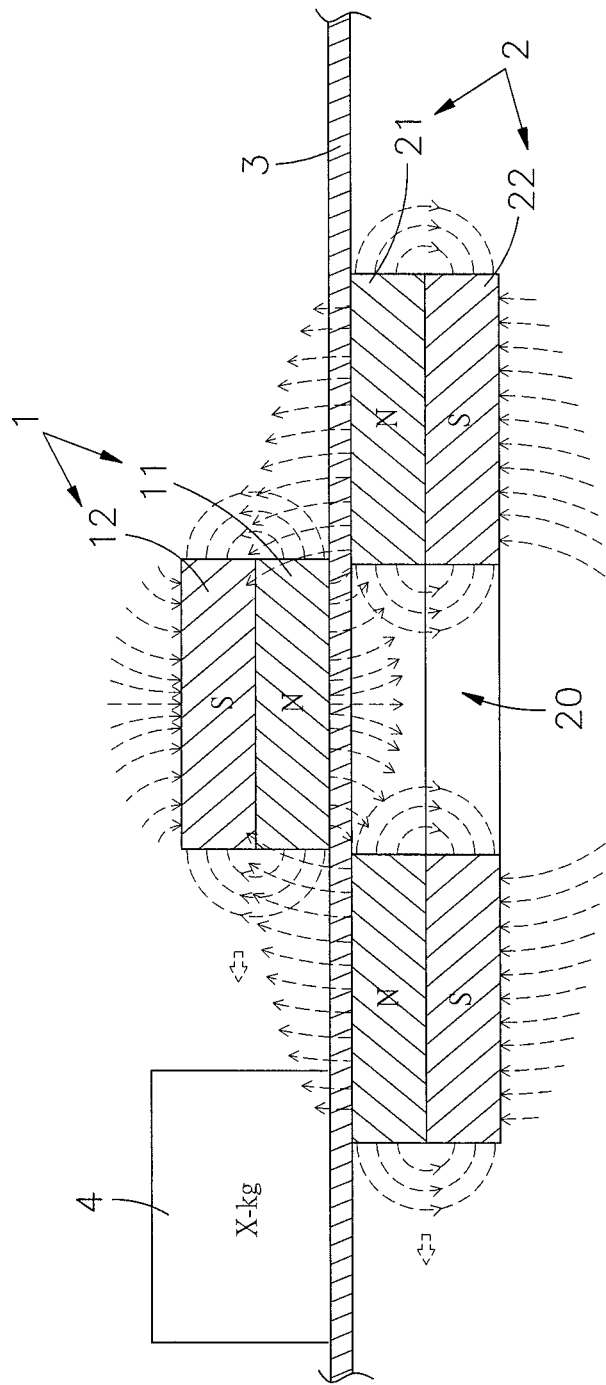
FIG. 5 is a schematic sectional side view illustrating an application example of the present invention.
Figure 6:
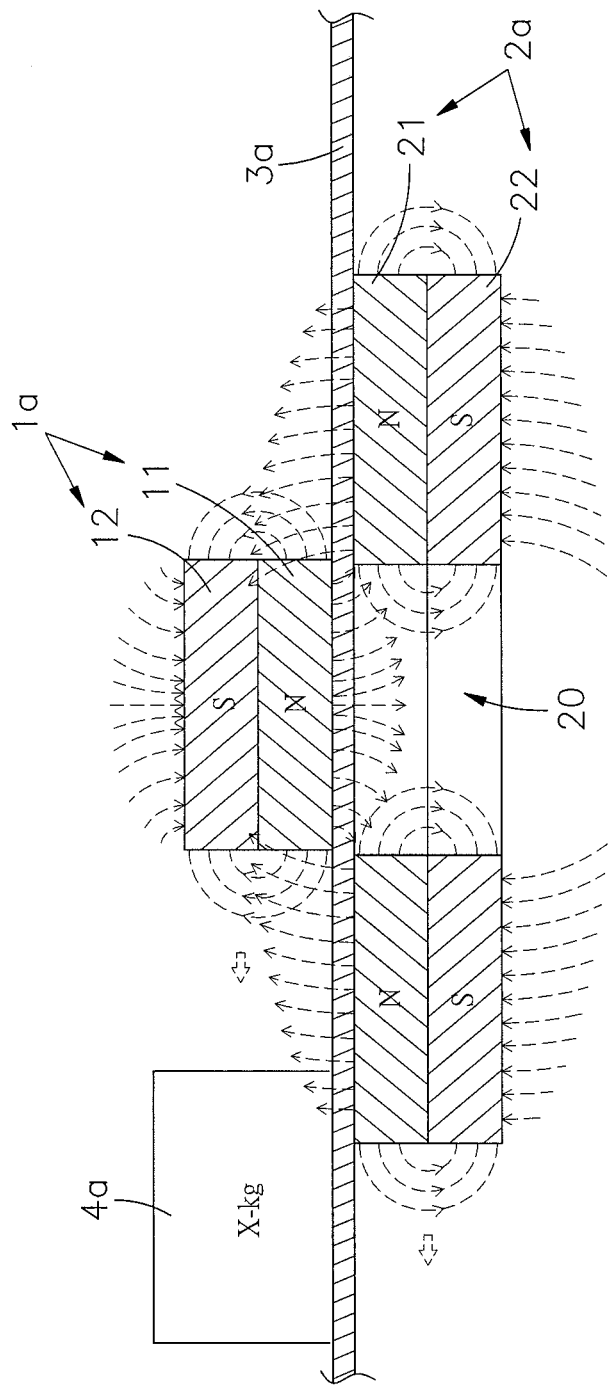
FIG. 6 is a schematic sectional side view of a magnetic drive transmission mechanism according to the prior art.
Figure 7:
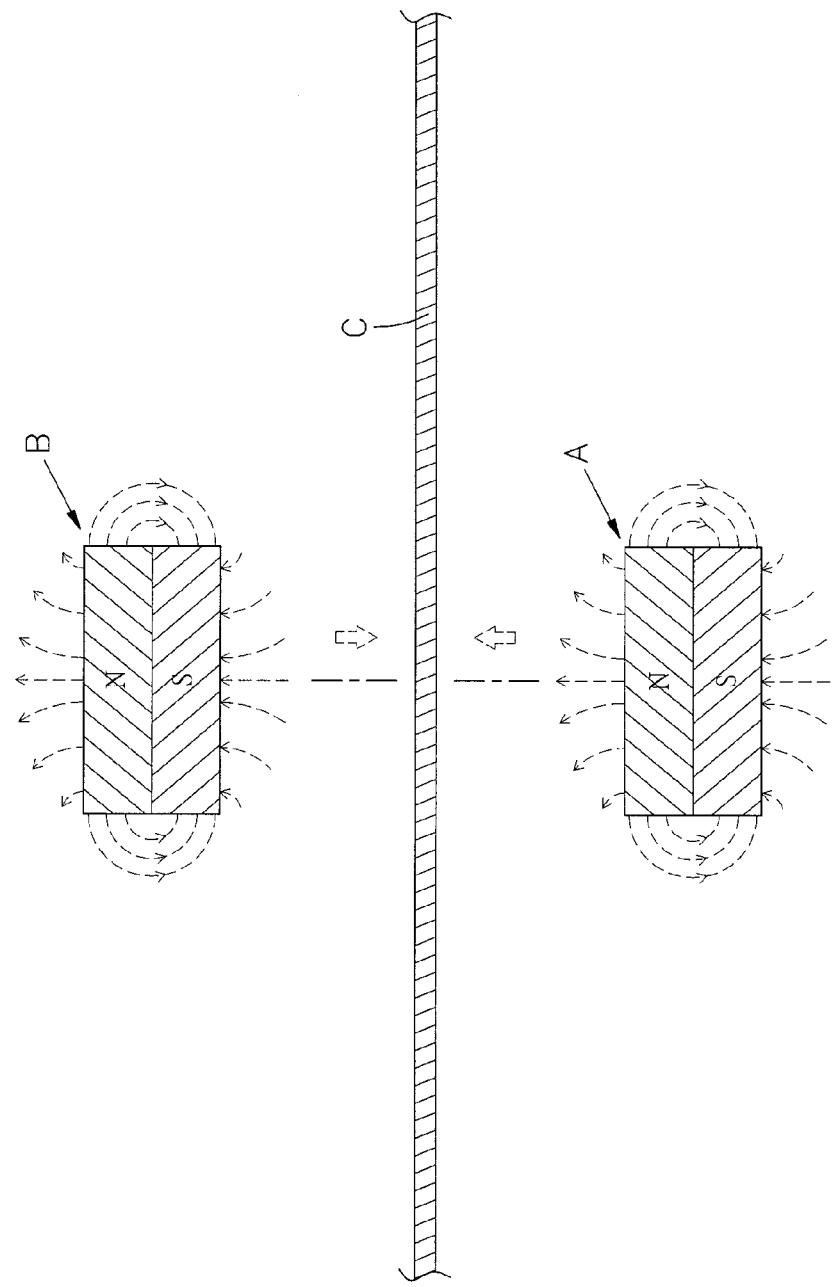
FIG. 7 is a sectional side exploded view of a non-contact type transmission mechanism according to the prior art.
Figure 8:
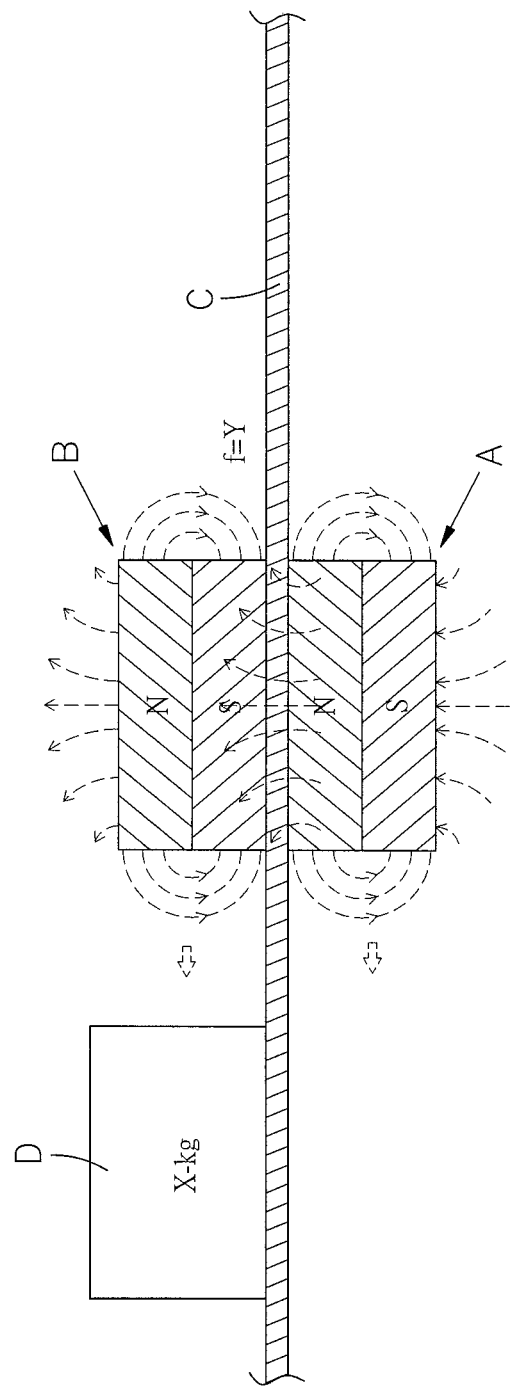
FIG. 8 is a schematic side view illustrating an operation status of the non-contact type transmission mechanism shown in FIG. 7.
Figure 9:
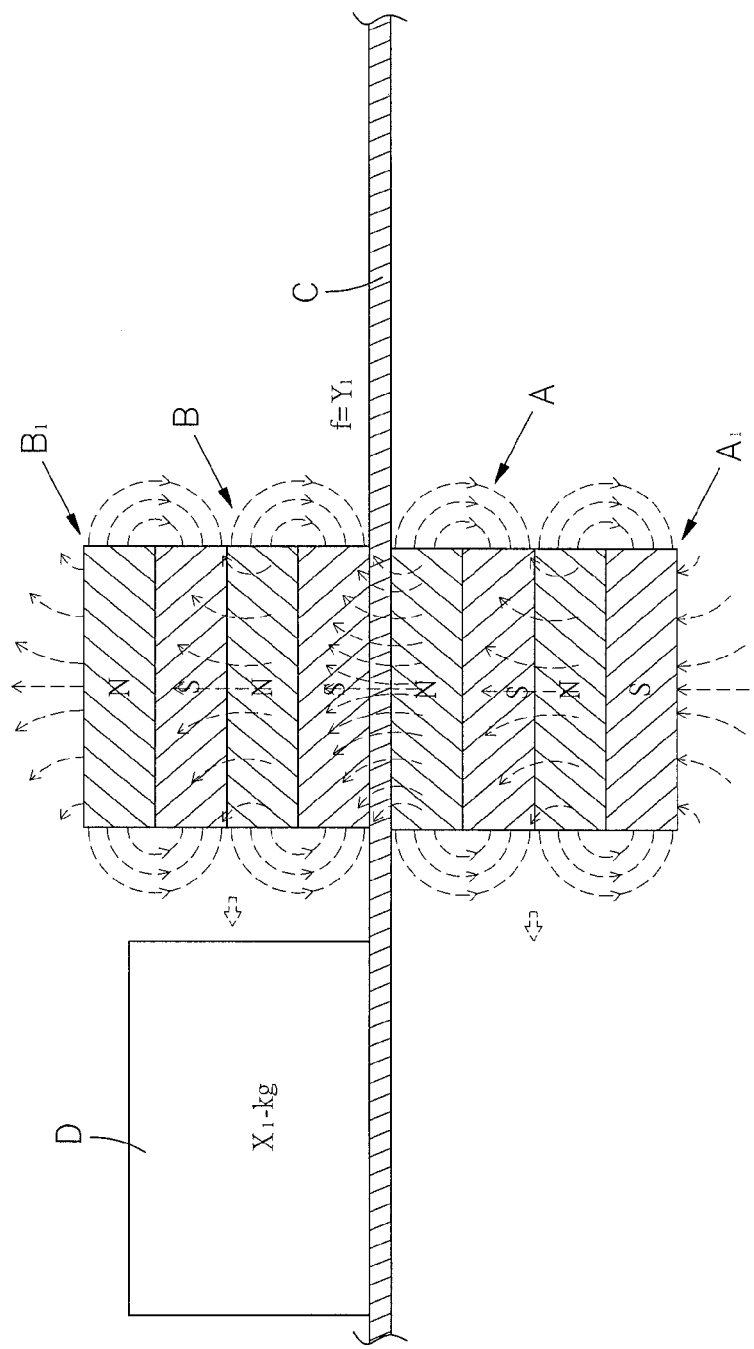
FIG. 9 is a sectional side view of another prior design of non-contact type transmission mechanism.

Referring to FIGS. 1-5, the invention provides a magnetic drive transmission method. The magnetic drive transmission method comprises the steps as follows:

(101) dispose a solid magnetic device 1 and a ring-shaped magnetic device 2 at opposing top and bottom surfaces of a work platform 3 and keep the solid magnetic device 1 and the ring-shaped magnetic device 2 in axial alignment.

(102) keep the same magnetic N poles 11,21 (or magnetic S poles 12,22) of the solid magnetic device 1 and ring-shaped magnetic device 2 to face toward the opposing top and bottom surfaces of the work platform 3 respectively.

(103) move the ring-shaped magnetic device 2 into contact with one surface, namely, the bottom surface of the work platform 3, and then move the solid magnetic device 1 into contact with the other surface, namely, the top surface of the work platform 3 while keeping the solid magnetic device 1 in axial alignment with the hollow inner diameter 20 of the ring-shaped magnetic device 2.

(104) when the solid magnetic device 1 is attached onto the top surface of the work platform 3, subject to the magnetic repulsive effect between the magnetic N poles 11,21 (or magnetic S poles 12,22) of the solid magnetic device 1 and ring-shaped magnetic device 2, the solid magnetic device 1 falls into the magnetic field lines of the ring-shaped magnetic device 2, creating a magnetic field downstream between the solid magnetic device 1 and the ring-shaped magnetic device 2 that changes the thrust of the same polarity (same magnetic N poles 11,21 or same magnetic S poles 12,22) repulsion, causing the solid magnetic device 1 and the ring-shaped magnetic device 2 to attract each other at the opposing top and bottom surfaces of the work platform 3 and to keep in balance in the transverse direction.

(105) move the solid magnetic device 1 and the ring-shaped magnetic device 2 along the opposing top and bottom surface of the work platform 3 synchronously to deliver a predetermined workpiece 4 near the solid magnetic device 1, forcing the workpiece 4 to slide along the top surface of the work platform 3 to a predetermined location.

In step (104), the magnetic N pole 11 or magnetic S pole 12 of the solid magnetic device 1 is attached onto the top surface of the metal work platform 3 to aim at the hollow inner diameter 20 of the ring-shaped magnetic device 2 and to enter within the magnetic field lines of the ring-shaped magnetic device 2 that flow from the magnetic N pole 21 toward the magnetic S pole 22. When the relatively smaller magnetic field lines of the solid magnetic device 1 enters within the relatively larger magnetic field lines of the ring-shaped magnetic device 2, a magnetic field downstream is created between the solid magnetic device 1 and the ring-shaped magnetic device 2, thus, the magnetic repulsive effect between the magnetic N pole 11 (or magnetic S pole 12) of the solid magnetic device 1 and the magnetic N pole 21 (or magnetic S pole 22) of ring-shaped magnetic device 2 is changed, causing the magnetic lines of force around the left and right sides of the solid magnetic device 1 to attract the magnetic lines of force around the left and right sides of the ring-shaped magnetic device 2, keeping the solid magnetic device 1 and the ring-shaped magnetic device 2 in balance and in position and maintaining the solid magnetic device 1 in the center position relative to the ring-shaped magnetic device 2. Subject to the effects described above, the solid magnetic device 1 and the ring-shaped magnetic device 2 are steadily secured to the opposing top and bottom surfaces of the metal work platform 3.

In one example of the present invention where the solid magnetic device 1 has the specifications of diameter Ψ20 mm and thickness 10 mm and the ring-shaped magnetic device 2 has the specifications of outer diameter Ψ40 mm with inner diameter Ψ20 mm and thickness 10 mm, we made tests and obtained the test results as follows:

| Lateral run-off force (magnetic attraction force) | | | | |
|---|---|---|---|---|
| Size | Solid: Ø20 mm Thickness 10 mm Ring-shaped: Ø40*20 mm Thickness 10 mm | | | |
| Plate thickness | $1^{st}$ | $2^{nd}$ | $3^{rd}$ | Average |
| 1.0 mm | 2.30 | 2.30 | 2.30 | 2.30 |
| 1.2 mm | 2.25 | 2.25 | 2.20 | 2.23 |
| 1.5 mm | 2.10 | 1.90 | 2.00 | 2.00 |
| 2.0 mm | 1.60 | 1.50 | 1.50 | 1.53 |

| Minimum starting force (maximum electrostatic friction) | | | | |
|---|---|---|---|---|
| Size | Solid: Ø20 mm Thickness 10 mm Ring-shaped: Ø40*20 mm Thickness 10 mm | | | |
| Plate thickness | $1^{st}$ | $2^{nd}$ | $3^{rd}$ | Average |
| 1.0 mm | 1.50 | 1.50 | 1.50 | 1.50 |
| 1.2 mm | 1.60 | 1.50 | 1.50 | 1.53 |
| 1.5 mm | 1.50 | 1.50 | 1.50 | 1.50 |
| 2.0 mm | 0.75 | 1.00 | 0.75 | 0.83 |

In the test result data stated above, the unit is Kgf. After the ring-shaped magnetic device 2 was attracted to the work platform 3, the solid magnetic device 1 was placed onto the work platform 3 to aim at the hollow inner diameter of the ring-shaped magnetic device 2 (see FIG. 3 and FIG. 4), allowing the magnetic lines of force of the magnetic N pole 11 of the solid magnetic device 1 to penetrate the hollow inner diameter and magnetic S pole 22 of the ring-shaped magnetic device 2 and to overcome the repulsive force between the magnetic N pole 11 and the magnetic S pole 22. At the same time, the magnetic lines of force of magnetic S pole 12 of the solid magnetic device 1 attract the magnetic N pole 21 of the ring-shaped magnetic device 2. Subject to change of the thickness of the work platform 3 (plate thickness) from 1.0 mm, 1.2 mm, 1.5 mm to 2.0 mm, the average magnetic attraction force between the solid magnetic device 1 and the ring-shaped magnetic device 2 can be within the range of 1.53 Kgf~2.30 Kgf, and the average of the maximum electrostatic friction can be within the range of 0.83 Kgf~1.50 Kgf, thus, the test result proves that the solid magnetic device 1 and the ring-shaped magnetic device 2 can be simultaneously attracted to the opposing top and bottom surface of the metal work platform 3, and can reduce the friction when moving.

In the example that the solid magnetic device 1 (solid) was: Ψ30 mm and 20 mm and the ring-shaped magnetic device 2 was: outer diameter Ψ60 mm* inner diameter Ψ30 mm and thickness 20 mm), we made tests and obtained the test results as follows:

| Lateral run-off force (magnetic attraction force) | | | | |
|---|---|---|---|---|
| Size | Solid: ⌀20 mm Thickness 10 mm Ring-shaped: ⌀60*20 mm Thickness 10 mm | | | |
| Plate thickness | $1^{st}$ | $2^{nd}$ | $3^{rd}$ | Average |
| 1.0 mm | 7.10 | 7.25 | 7.00 | 7.12 |
| 1.2 mm | 7.25 | 7.25 | 7.30 | 7.27 |
| 1.5 mm | 6.25 | 6.25 | 6.00 | 6.17 |
| 2.0 mm | 5.50 | 5.25 | 5.20 | 5.32 |

| Minimum starting force (maximum electrostatic friction) | | | | |
|---|---|---|---|---|
| Size | Solid: ⌀30 mm Thickness 20 mm Ring-shaped: ⌀60*30 mm Thickness 20 mm | | | |
| Plate thickness | $1^{st}$ | $2^{nd}$ | $3^{rd}$ | Average |
| 1.0 mm | 4.50 | 4.50 | 4.50 | 4.50 |
| 1.2 mm | 3.90 | 3.75 | 3.75 | 3.80 |
| 1.5 mm | 4.25 | 4.50 | 4.25 | 4.33 |
| 2.0 mm | 2.25 | 2.25 | 2.25 | 2.25 |

In this example, the average magnetic attraction force between the solid magnetic device 1 and the ring-shaped magnetic device 2 can be within the range of 5.32 Kgf~7.27 Kgf, the average maximum electrostatic friction can be within the range of 2.25 Kgf~4.50 Kgf. This test result proves that when the solid magnetic device 1 and the ring-shaped magnetic device 2 have the same magnetic N poles 11,21 or the same magnetic S poles 12,22 respectively attached to the opposing top and bottom surfaces of the metal work platform 3, the minimum starting force (maximum electrostatic force) can be achieved. Thus, the ring-shaped magnetic device 2 can be disposed at one side of the metal work platform 3 to drive the opposite solid magnetic device 1, causing the solid magnetic device 1 to move the workpiece 4. Since the friction force between the ring-shaped magnetic device 2 and the solid magnetic device 1 is relatively small, the friction generated during the operation of the solid magnetic device 1 to move the workpiece 4 is minimized, and thus the workpiece 4 can be delivered efficiently.

It is clear from the above experimental data that when the solid magnetic device 1 and the ring-shaped magnetic device 2 have the respective same magnetic poles respectively attached to the opposing top and bottom surface of the metal work platform 3, the magnetic N pole 11 (or magnetic S pole 12) of the solid magnetic device 1 is in alignment with the hollow inner diameter 20 of the ring-shaped magnetic device 2, a magnetic field downstream is produced between the solid magnetic device 1 and the ring-shaped magnetic device 2, causing the magnetic S pole 12 of the solid magnetic device 1 to attract the magnetic N pole 21 of the ring-shaped magnetic device 2 and the magnetic N pole 11 of the solid magnetic device 1 to attract the magnetic S pole 22 of the ring-shaped magnetic device 2. Since the area of the magnetic N pole 21 of the ring-shaped magnetic device 2 is greater than the area of the magnetic N pole 11 of the solid magnetic device 1, the magnetic attraction force between the magnetic N pole 21 of the ring-shaped magnetic device 2 and the magnetic S pole 12 of the solid magnetic device 1 is greater than the magnetic repulsive force between the magnetic N pole 11 of the solid magnetic device 1 and the magnetic N pole 21 of the ring-shaped magnetic device 2. Further, the magnetic attraction force in the hollow inner diameter 20 between the magnetic S pole 22 of the ring-shaped magnetic device 2 and the magnetic N pole 11 of the solid magnetic device 1 reduces the magnetic repulsive force in the hollow inner diameter 20 between the magnetic N pole 11 of the solid magnetic device 1 and the magnetic N pole 21 of the ring-shaped magnetic device 2. Thus, the magnetic repulsive force between the magnetic N pole 11 of the solid magnetic device 1 and the magnetic N pole 21 of the ring-shaped magnetic device 2 can be overcome, allowing the solid magnetic device 1 and the ring-shaped magnetic device 2 to be simultaneously and positively attracted to the opposing top and bottom surfaces of the metal work platform 3.

Further, the solid magnetic device 1 can be shaped like a cylinder, oval column, rectangular column, hexagonal column or polygonal column; the ring-shaped magnetic device 2 can be shaped like a circular ring, oval ring, rectangular ring, hexagonal ring or polygonal ring.

Further, the magnetic attraction force between the solid magnetic device 1 and the ring-shaped magnetic device 2 at the two opposite sides of the work platform 3 is obviously smaller than the steady state retention force in the left and right parallel direction. Thus, when the ring-shaped magnetic device 2 drives the solid magnetic device 1 to move the predetermined workpiece 4 on the top surface of the metal work platform 3, in addition to the magnetic thrust of the solid magnetic device 1, the magnetic thrust of the ring-shaped magnetic device 2 also assists moving the predetermined workpiece 4. Since the volume of the ring-shaped magnetic device 2 is larger than the volume of the solid magnetic device 1, the magnetic retention force of the solid magnetic device 1 and the ring-shaped magnetic device 2 in the left and right parallel direction is significantly greater than the magnetic attraction force in the vertical direction between the solid magnetic device 1 and the ring-shaped magnetic device 2, thus, the relatively heavier workpiece 4 can be moved to slide along the work platform 3 by the magnetic thrust of the solid magnetic device 1 without causing much friction resistance or lowering the speed of the movement of the solid magnetic device 1 and the ring-shaped magnetic device 2 in moving the predetermined workpiece 4 on the top surface of the work platform 3. Thus, the invention can deliver the predetermined workpiece 4 smoothly to the desired location, enhancing the practical effect of non-contact magnetic transmission.

In general, in accordance with the preferred embodiment of the magnetic drive transmission method of the present invention, the solid magnetic device 1 and the ring-shaped magnetic device 2 have the respective same magnetic poles (for example, magnetic N poles 11,21) respectively attached to the opposing top and bottom surfaces of the metal work platform 3. Since the volume of the ring-shaped magnetic device 2 is larger than the volume of the solid magnetic device 1, a magnetic repulsive force is produced when the solid magnetic device 1 is spaced above the top surface of the metal work platform 3 within a predetermined range with the magnetic N pole 11 thereof aimed at the hollow inner diameter 20 of the ring-shaped magnetic device 2 that has its magnetic N pole 21 attached to the bottom surface of the metal work platform 3. However, when the magnetic N pole 11 of the solid magnetic device 1 is attached to the top surface of the metal work platform 3, the solid magnetic device 1 enters within the magnetic field lines of the ring-shaped magnetic device 2, causing magnetic attraction between the magnetic lines of force of the magnetic N pole 11 of the solid magnetic device 1 and the magnetic lines of force of the magnetic S pole 22 of the ring-shaped magnetic device 2 while generation of a magnetic retention force in the left and right parallel direction, and thus, the solid magnetic device 1 and the ring-shaped magnetic device 2 are steadily secured to the opposing top and bottom surfaces of the work platform 3. Further, due to the generation of the magnetic field downstream between the solid magnetic device 1 and the ring-shaped magnetic device 2, the solid magnetic device 1 and the ring-shaped magnetic device 2 are magnetically attracted together. Since the magnetic attraction force between the solid magnetic device 1 and the ring-shaped magnetic device 2 at the two opposite sides of the work platform 3 is significantly smaller than the steady state retention force in the left and right parallel direction, when the ring-shaped magnetic device 2 can be controlled to drive the solid magnetic device 1 in moving the predetermined workpiece 4 on the top surface of the metal work platform 3 without causing much friction resistance.

In conclusion, the invention provides a magnetic drive transmission method, which is to attach the respective same magnetic poles (magnetic N poles or S poles of a solid magnetic device and a ring-shaped magnetic device to the opposing top and bottom surfaces of a metal work platform and to keep the solid magnetic device in axial alignment with the hollow inner diameter of the ring-shaped magnetic device so that the solid magnetic device falls into the magnetic field lines of the ring-shaped magnetic device, creating a magnetic field downstream between the solid magnetic device and the ring-shaped magnetic device that changes the thrust of the same polarity (same magnetic N poles or same magnetic S poles) repulsion, causing the solid magnetic device and the ring-shaped magnetic device to attract each other at the opposing top and bottom surfaces of the work platform and to keep in balance in the transverse direction. At this time, the solid magnetic device can be driven by the ring-shaped magnetic device to move a predetermined workpiece along the top surface of the work platform smoothly without causing much friction resistance.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A magnetic drive transmission method, comprising the steps of:
    (101) disposing a solid magnetic device and a ring-shaped magnetic device at opposing top and bottom surfaces of a work platform;
    (102) keeping the same magnetic poles of said solid magnetic device and said ring-shaped magnetic device to face toward the opposing top and bottom surfaces of said work platform respectively;
    (103) moving said ring-shaped magnetic device into contact with the bottom surface of said work platform, and then moving said solid magnetic device into contact with the top surface of said work platform while keeping said solid magnetic device in axial alignment with a hollow inner diameter of said ring-shaped magnetic device;
    (104) using the magnetic repulsive effect between the same magnetic poles of said solid magnetic device and said ring-shaped magnetic device to cause said solid magnetic device to enter within the magnetic field lines of said ring-shaped magnetic device when said solid magnetic device is attached onto the top surface of said work platform, so as to create a magnetic field downstream between said solid magnetic device and said ring-shaped magnetic device that changes the thrust of the same polarity repulsion, causing said solid magnetic device and said ring-shaped magnetic device to attract each other at the opposing top and bottom surfaces of said work platform keeping said solid magnetic device and said ring-shaped magnetic device in balance in the transverse direction; and
    (105) moving said solid magnetic device and said ring-shaped magnetic device along the opposing top and bottom surface of said work platform synchronously to deliver a predetermined workpiece, forcing said workpiece to slide along the top surface of said work platform to a predetermined location.

2. The magnetic drive transmission method as claimed in claim 1, wherein in step (101) said solid magnetic device and said ring-shaped magnetic device are kept in axial alignment.

3. The magnetic drive transmission method as claimed in claim 2, wherein said solid magnetic device is shaped like a cylinder, oval column, rectangular column, hexagonal column or polygonal column.

4. The magnetic drive transmission method as claimed in claim 2, wherein said ring-shaped magnetic device is shaped like a circular ring, oval ring, rectangular ring, hexagonal ring or polygonal ring.

5. The magnetic drive transmission method as claimed in claim 1, wherein in steps (102,103), said solid magnetic device and said ring-shaped magnetic device are disposed with the magnetic N poles thereof facing toward each other.

6. The magnetic drive transmission method as claimed in claim 1, wherein in steps (102,103), said solid magnetic device and said ring-shaped magnetic device are disposed with the magnetic S poles thereof facing toward each other.

7. The magnetic drive transmission method as claimed in claim 1, wherein in step (104), the magnetic N pole or S pole of said ring-shaped magnetic device is attached to the said bottom surface of said work platform, and the same magnetic pole of said solid magnetic device is attached to the said top surface of said work platform so that a magnetic downstream is created between said solid magnetic device and said ring-shaped magnetic device, causing magnetic attraction between said solid magnetic device and said ring-shaped magnetic device and keeping said solid magnetic device in the position at the center of said ring-shaped magnetic device and prohibiting said solid magnetic device from lateral deviation relative to said ring-shaped magnetic device.

* * * * *